United States Patent
Henry et al.

(10) Patent No.: US 10,470,086 B2
(45) Date of Patent: Nov. 5, 2019

(54) STATEFUL APPLICATION IDENTIFICATION WHILE ROAMING

(71) Applicant: Cisco Technology, Inc., San Jose, CA (US)

(72) Inventors: Jerome Henry, Pittsboro, NC (US); Robert Barton, Richmond (CA); Sudhir Kumar Jain, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/701,851

(22) Filed: Sep. 12, 2017

(65) Prior Publication Data

US 2019/0082360 A1   Mar. 14, 2019

(51) Int. Cl.
*H04W 36/00*   (2009.01)
*H04L 12/859*   (2013.01)
*H04W 88/12*   (2009.01)
*H04W 84/12*   (2009.01)
*H04W 36/14*   (2009.01)

(52) U.S. Cl.
CPC ..... *H04W 36/0016* (2013.01); *H04L 47/2475* (2013.01); *H04W 36/0044* (2013.01); *H04W 36/14* (2013.01); *H04W 84/12* (2013.01); *H04W 88/12* (2013.01)

(58) Field of Classification Search
None
See application file for complete search history.

(56) References Cited

U.S. PATENT DOCUMENTS

| | | | |
|---|---|---|---|
| 7,561,549 B2 | 7/2009 | Meier et al. | |
| 7,706,345 B2 | 4/2010 | Meier et al. | |
| 8,995,459 B1 | 3/2015 | Bharghavan et al. | |
| 9,107,114 B2 * | 8/2015 | Zdarsky | H04W 36/0033 |

(Continued)

OTHER PUBLICATIONS

C. Yap, E. Qi, K. Sood, S. Bangolae and C. Bell, "Issues with real-time streaming applications roaming in QoS-based secure IEEE 802.11 WLANs," 2005 2nd Asia Pacific Conference on Mobile Technology, Applications and Systems, Guangzhou, 2005, pp. 1-7. doi: 10.1109/MTAS.2005.243883 (Year: 2005).*

(Continued)

*Primary Examiner* — Ayaz R Sheikh
*Assistant Examiner* — Tarell A Hampton
(74) *Attorney, Agent, or Firm* — Edell, Shapiro & Finnan, LLC

(57) ABSTRACT

Stateful roaming techniques are provided for use in a wireless network. In one embodiment, a method is provided that includes: obtaining flow information descriptive of one or more traffic flows associated with a wireless client device that is associated to a current access point in a wireless network; storing state data representing the flow information for flows associated with the wireless client device together with a traffic descriptor for each flow; determining that the wireless client device is seeking to roam from the current access point to a new access point; and sending the state data for the wireless client device to the new access point to enable the new access point to apply a policy based on the state data before the wireless client device completes its roam to the new access point.

20 Claims, 12 Drawing Sheets

(56) References Cited

U.S. PATENT DOCUMENTS

| | | | |
|---|---|---|---|
| 2004/0095912 A1* | 5/2004 | Gao | H04W 28/26 370/338 |
| 2007/0167167 A1 | 7/2007 | Jiang | |
| 2008/0273520 A1 | 11/2008 | Kim et al. | |
| 2009/0092093 A1 | 4/2009 | Wu et al. | |
| 2009/0116647 A1* | 5/2009 | Korus | H04L 63/064 380/272 |
| 2009/0154422 A1* | 6/2009 | Park | H04W 36/26 370/331 |
| 2010/0067400 A1 | 3/2010 | Dolganow et al. | |
| 2011/0196971 A1 | 8/2011 | Reguraman et al. | |
| 2011/0219426 A1 | 9/2011 | Kim et al. | |
| 2011/0222520 A1 | 9/2011 | Montemurro et al. | |
| 2012/0140633 A1 | 6/2012 | Stanwood et al. | |
| 2014/0024375 A1* | 1/2014 | Fitzpatrick | H04W 36/30 455/436 |
| 2014/0106770 A1* | 4/2014 | Valentin | H04L 67/32 455/452.1 |
| 2014/0140211 A1* | 5/2014 | Chandrasekaran | H04L 47/2441 370/235 |
| 2014/0254502 A1 | 9/2014 | Cai et al. | |
| 2014/0341076 A1 | 11/2014 | Orlandi et al. | |
| 2015/0017985 A1* | 1/2015 | Safavi | H04W 36/0083 455/436 |
| 2016/0277927 A1 | 9/2016 | Lee et al. | |
| 2017/0245170 A1 | 8/2017 | Henry et al. | |

OTHER PUBLICATIONS

H. Yang, Y. Li, F. Chou, T. Wu and W. Lee, "Pre-Register Algorithm for SVC by Fast BSS Transition Wireless Networks," 2009 Fifth International Conference on Intelligent Information Hiding and Multimedia Signal Processing, Kyoto, 2009, pp. 1249-1252. doi: 10.1109/IIH-MSP.2009.289 (Year: 2009).*

Machan P, Wozniak J. On the fast BSS transition algorithms in the IEEE 802.11r local area wireless networks. Telecommunication Systems. 2013;52(4):2713-2720. doi:10.1007/s11235-011-9590-5. (Year: 2013).*

Barbara Orlandi et al., "Wi-Fi Roaming—Building on ANDSF and Hotspot2.0", Alcatel-Lucent, 2012, 45 pgs.

"3rd Generation Partnership Project; Technical Specification Group Services and System Aspects; Policy and charging control architecture", (Release 13), 3GPP TS 23.203 V13.5.1, Sep. 2015, 243 pgs.

"Application Visibility and Control Feature Deployment Guide", http://www.cisco.com/c/en/us/td/docs/wireless/controller/technotes/8-2 . . . , Cisco, Updated: Dec. 2015, 60 pgs.

"Network Technology Performance Evaluation Cisco Application Visibility and Control (AVC)", Cisco, School of Information Studies Syracuse University, Feb. 1, 2013, 6 pgs.

International Search Report and Written Opinion in counterpart International Application No. PCT/US2018/049644, dated Dec. 5, 2018, 11 pages.

Jon Edney, et al., "TAP-JIT Resources Pre-Allocation", IEEE P802.11, Wireless LANs, IEEE 802.11-05/0228r0, Mar. 2005, 11 pages.

* cited by examiner

US 10,470,086 B2

STATEFUL APPLICATION IDENTIFICATION WHILE ROAMING

TECHNICAL FIELD

The present disclosure relates to wireless networks.

BACKGROUND

In wireless local area networks, the notion of Quality of Service (QoS) refers to the capability of a network to provide better service to selected network traffic (applications) over various technologies. A goal of QoS is to provide priority, including dedicated bandwidth, controlled jitter and latency (required by some real-time and interactive traffic), and improved loss characteristics.

DESCRIPTION OF EXAMPLE EMBODIMENTS

Overview

Figure 1A:
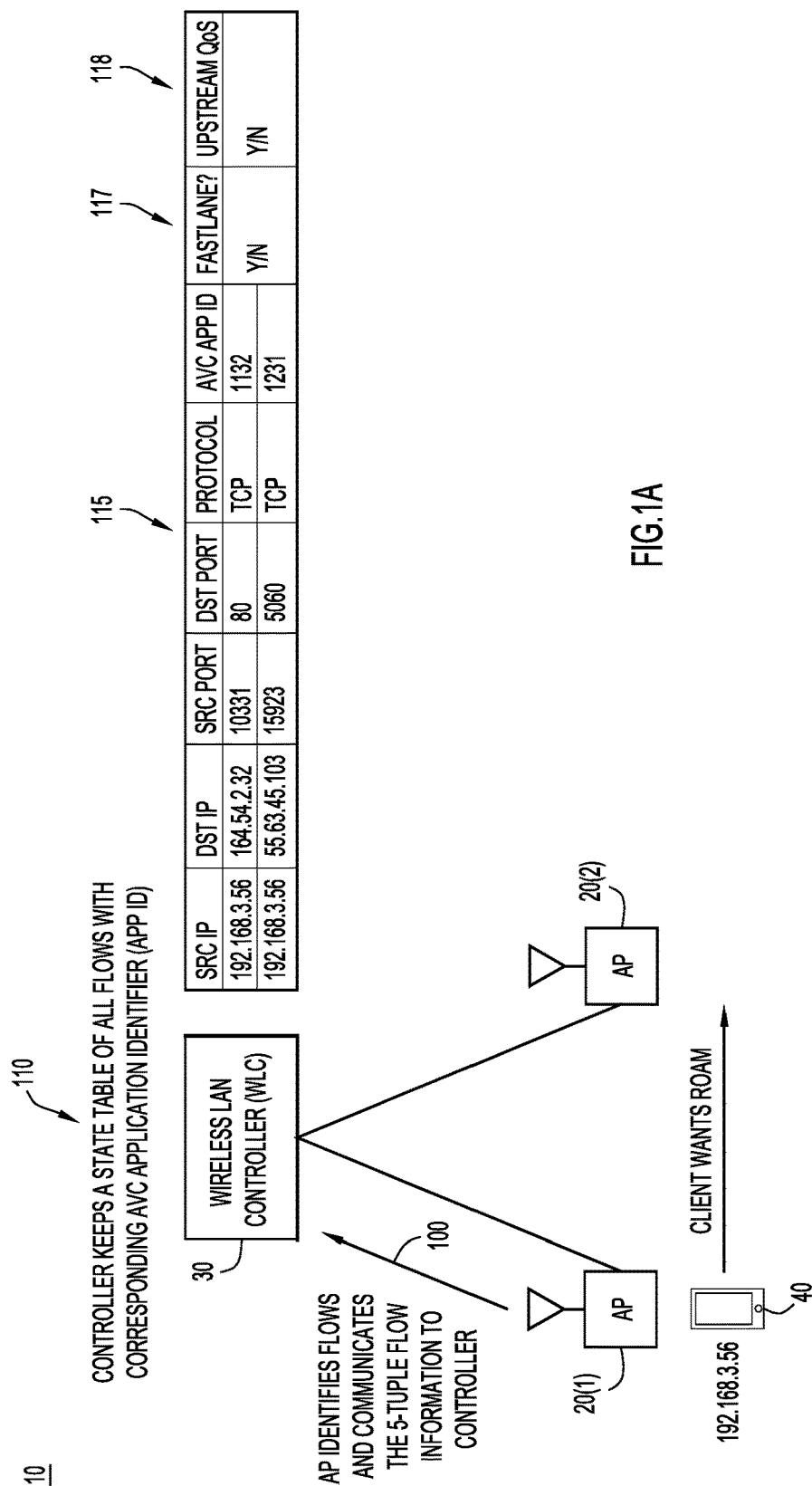
FIGS. 1A-1C generally depict operational flows of the stateful QoS marking techniques, according to an example embodiment.

Presented herein are techniques for stateful application identification while roaming in a wireless network. In one embodiment, a method is provided that includes obtaining flow information descriptive of one or more traffic flows associated with a wireless client device that is associated to a current access point in a wireless network; storing state data representing the flow information for flows associated with the wireless client device together with a traffic descriptor for each flow; determining that the wireless client device is seeking to roam from the current access point to a new access point; and sending the state data for the wireless client device to the new access point to enable the new access point to apply a policy based on the state data before the wireless client device completes its roam to the new access point.

Detailed Description

Traffic flowing through a communications network may be viewed as a set of independent flows (also referred to herein as "network connections"). For instance, a flow may comprise a set of data packets that may require similar treatment by the network. Flows may be defined according to a wide range of criteria to meet different needs. For instance, a flow may be the set of packets sent from one host to another or the set of packets exchanged by a pair of communicating application programs. For example, a flow may represent the network traffic flowing between a game client and a game server. As another example, a flow may represent the network traffic flowing between a streaming content server and a client. There may be many flows passing through any point in the network at any time.

In many circumstances, select flows may be considered more important or to be of a higher priority than other flows. For instance, a flow containing voice over Internet Protocol (VoIP) data may be considered a relatively high priority flow, as any delay or interruption to such a flow may directly impact a user's experience (e.g., by interrupting the user's call). As such, a network device may treat such a flow as having a higher priority when allocating the network device's fixed resources amongst the flows. Additionally, some flows may be considered to be more time-sensitive than other network flows. For example, while all network flows may be considered to be of equal importance, certain network flows may not be delayable, while other flows may operate is a satisfactory manner even with delay.

Network devices within the network can use a Quality of Service (QoS) policy to manage such relative priorities between the flows. In addition to relative priorities between the flows, such a QoS policy can specify a number of other QoS metrics for each of the flows, e.g., minimum thresholds of acceptable performance for the respective flows, maximum network throughput allowed for each respective flow, and so on.

A number of different techniques may be used to assign priority levels and QoS requirements for each of the flows on a network device. For instance, a user (e.g., a network administrator) may manually create a QoS policy that identify flows according to properties of the flows (e.g., a specified port number, a particular Internet Protocol (IP) address, etc.) and may manually configure each network device accordingly. Another technique for determining flow information may involve deep packet inspection (DPI). As an example, for a particular flow, logic on the network device may be configured to examine the data portion within the packets of the particular flow, as well as header information within the packets, in order to determine information about the flow (e.g., a classification of the flow, such as gaming, VoIP, content streaming, etc.). The determined information may then be used for numerous flow management purposes, including prioritization, QoS requirements, security functions and so on. According to the techniques presented herein, when an application is identified using DPI (an "expensive" operation on the access point) this information can be used on all future access points to which the client roams to for both QoS as well as security enforcement.

In an IEEE 802.11 wireless local area network (WLAN), a feature called "Fastlane" QoS provides increased QoS treatment for certain wireless clients. According to Fastlane QoS, a wireless client may create a whitelist to determine which applications to mark for QoS. Although the whitelist is not created on a wireless LAN controller (and the wireless LAN controller is not directly involved in the creation of the client whitelist), it is possible to know (1) that the client supports the whitelist (the client is a Fastlane client), and (2) which application is whitelisted (only whitelisted applications have QoS markings).

A function called Application Visibility and Control running on the wireless LAN controller or on an access point can honor the QoS marking from the access point or wireless LAN controller and upwards in the network hierarchy. The first few frames between the AP and the wireless LAN controller are unmarked. This is an undesirable but an unavoidable consequence of the reflective QoS mechanism). In the future, the Application Visibility and Control function may run on the AP.

However, the Application Visibility and Control function is not stateful for Fastlane clients. As a consequence, when the client roams, the first upstream packets lose their QoS marking as it takes several packets before the Network Based Application Recognition (NBAR) engine is able to recognize the application's signature.

In a centralized mode, the wireless LAN controller first needs upstream traffic from the client to identify the application, then downstream traffic with QoS marking, in order to generate new QoS policies (QoS remarking, rate limiting, dropping traffic). Once this is done, the wireless LAN controller is able to extend the reflective Application Visibility and Control policy to the new AP (to which the client roamed) and the policy is applied to the client in the upstream direction.

When the full Application Visibility and Control client flow state is moved from one AP to the next, it can become challenging to discriminate Fastlane clients and the whitelisted applications for these clients.

A mechanism is presented herein to increase the efficiency of roaming of wireless clients in a WLAN by allowing policies such as QoS markings to be applied to the very first client upstream packet, after a roam that continues a flow initiated at the previous AP. This is useful for Fastlane clients and applications in their whitelist as well as for non-Fastlane clients, and also to allow better initial upstream QoS support during roaming.

Generally speaking, the mechanism allows the knowledge about the QoS marking state by a client of its traffic while it was associated to one AP to be shared with a new AP to which that client has roamed, even before the roam is complete, so that the new AP does not need to start learning that client's QoS marking state from scratch through deep packet inspection. That is, once an AP learns about the application, it records it in the wireless LAN controller's state table for future use. However, the techniques presented herein may be used in cases where there is a wireless LAN controller and cases where there is not a wireless LAN controller. The only difference being that the state table (state data) would reside in different places.

After the NBAR engine in the wireless LAN controller identifies an application being used by a client, it can uniquely reference the application by its 5-tuple flow information (Src IP, Dst IP, Src Port, Dst Port, Protocol Type). The rule can be passed down to the AP. After the current AP identifies an application through the 5-tuple, the flow information is then used to apply policies upstream on the AP.

In order to improve the roaming experience, the markings (or other policies) enforced by Application Visibility and Control (AVC) function need to be applied as the client roams. This means that the first upstream packets on a new AP need to have the same QoS or packet drop treatment as the last upstream packet on the previous AP in order to maintain quality of experience and security enforcement (especially for real-time applications). However, in the case of a Fastlane (FL) client, only applications in the whitelist receive QoS treatment.

To achieve this goal, a mechanism is provided to pass the 5-tuple flow information to the new AP at roam time, along with tags identifying FL clients and whitelisted applications of FL clients, instead of forcing the new AP to re-examine all the traffic coming from the client and begin Application Visibility and Control inspection all over again, or the new local/centralized mode AP to send upstream traffic as best effort until it receives new rules from the wireless LAN control, or the full flow table to be sent (wasting resources where only target applications for target client should receive QoS treatment).

To do this, two elements are used: (1) a state table is kept of all the flows along with the associated AVC application identifier (App ID), and (2) utilization of the IEEE 802.11r Fast Transition (FT) protocol for certain clients.

Figure 1B:
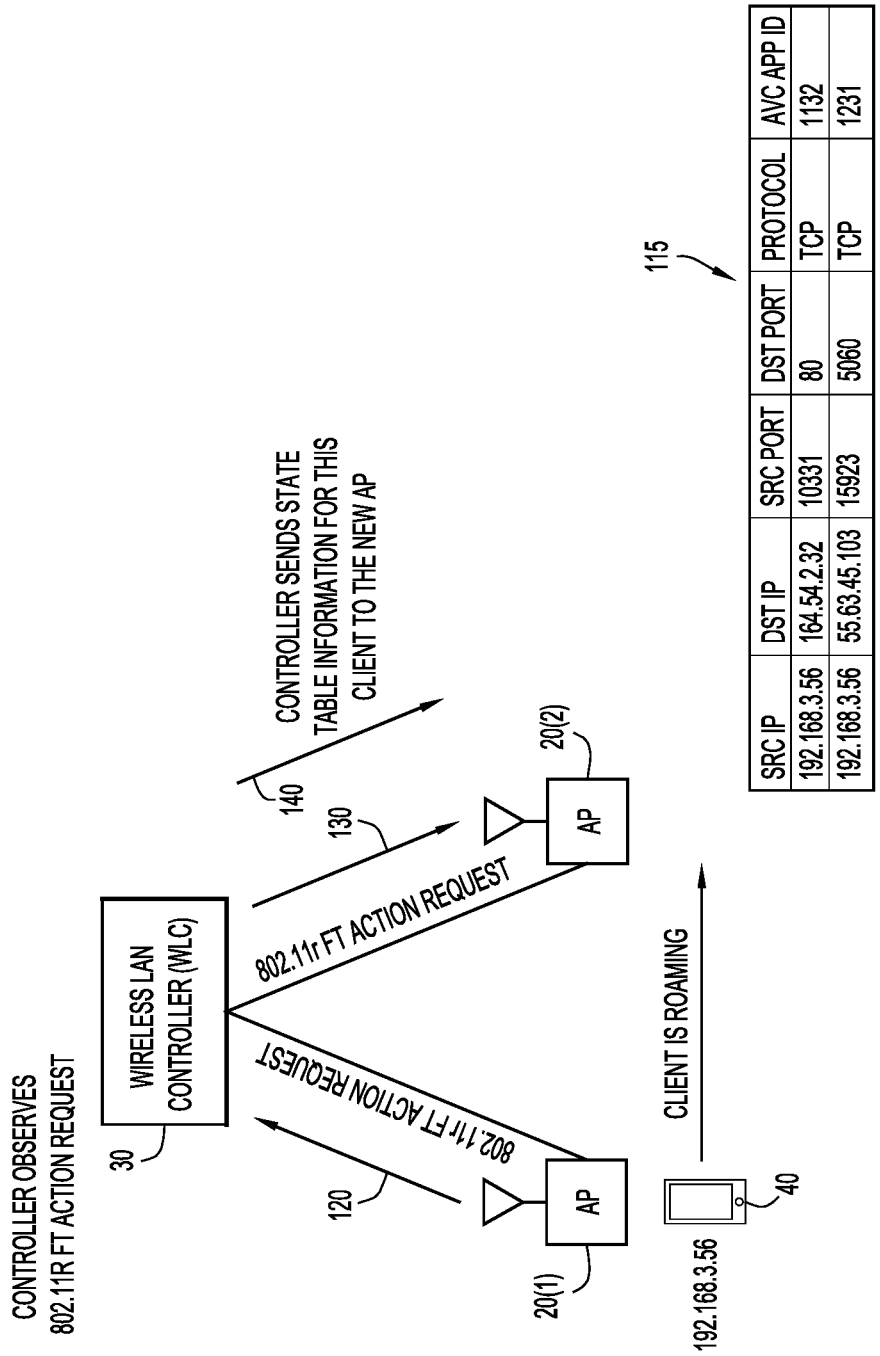
Figure 1C:
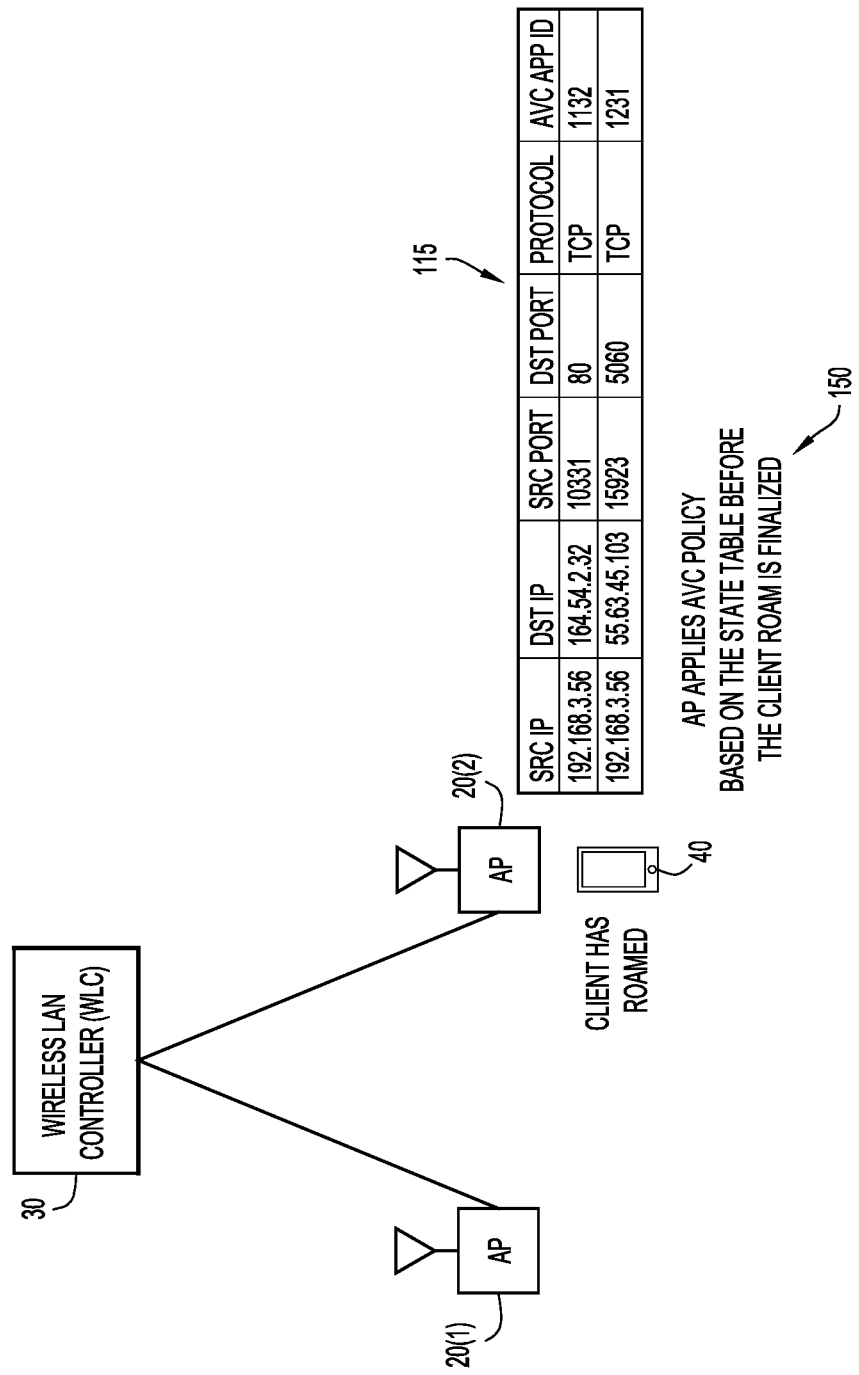

Reference is now made to FIGS. 1A-1C for a description of the general principals of the mechanism. Referring first to FIG. 1A, a simple WLAN 10 is shown that includes two APs 20(1) and 20(2), a wireless LAN controller (WLC) 30 and a wireless client device 40. In this example, the wireless client device is a cell phone and it wants to roam from its current AP 20(1) to new AP 20(2). The wireless client has an IP address "192.168.3.56".

Wireless client device 40 may comprise an operating system that may include a QoS policy component. APs 20(1) and 20(2) may include a QoS policy management component. Wireless client device 40 may be, but is not limited to, a tablet device, a mobile device, a smart phone, a telephone, a remote control device, a personal computer, a network computer, or other similar device capable of accessing and using a WLAN that may be accessed through an AP.

An administrator of the network may configure a list of applications and their expected QoS treatment (e.g., L3 and or L2 marking, bandwidth, etc.). Each application on modern computing devices may correspond to a unique identifier (e.g., an application identifier). For example, on an Apple® iOS® device, such a unique identifier may be called an app ID. As another example, on an Android™ device, this unique identifier may be called a bundle ID. As yet another example, on a Microsoft® Windows® device, this unique identifier may be called an Application ID.

Each application-specific identifier may be unique and may stay the same as the application release version changes. In one embodiment, the infrastructure may maintain a mapping table listing the applications supported on the wireless infrastructure, along with their identifiers for the supported client operating system vendors. In another embodiment, this mapping may be built dynamically when the administrator configures the network application QoS policy, by retrieving the application identifiers from the well-known application identifier repositories of the supported client STA operating system vendors.

The QoS policy management component on the APs 20(1) and 20(2) may be configured to transmit an aggregated QoS policy to wireless client device 40, upon successful authentication and association of wireless client device 40 on the network. The QoS policy management component on the APs 20(1) and 20(2) may be configured to transmit the aggregated QoS policy to wireless client device 40 at other times during the client session (or before association). For example, such an aggregated QoS policy may specify a listing of application identifiers and corresponding QoS information for each of the listed application identifiers. The QoS policy component on wireless client device 40, upon receiving the aggregated QoS policy, may implement the QoS policy for network flows created by applications on wireless client device 40. For example, for a given network flow, the QoS policy component on the wireless client device 40 may determine an application corresponding to the network flow and may determine QoS treatment for the network flow based on the received QoS policy. For instance, if the received QoS policy specifies QoS information for the determined application, the QoS policy component on the wireless client may apply the specified QoS information to the given network flow. As another example, if the received QoS policy does not specify any QoS information for the determined application, the QoS policy component on the wireless client device 40 may apply a default QoS treatment to the given network flow.

At 100, the current AP 20(1) identifies flows, using an NBAR function, and communicates the 5-tuple flow information (Src IP, Dst IP, Src Port, Dst Port, Protocol Type) to the wireless LAN controller 30. At 110, the wireless LAN controller 30 keeps a state table of all flows and their associated AVC application identifier (ID) for each wireless client. An example of a state table that the wireless LAN controller 30 stores for wireless client device 40 is shown at reference numeral 115. FIG. 1A represents a point in time prior to the wireless client device 40 indicating that it wants to roam.

Each flow that is uniquely matched by an AVC policy has an entry in the state table and does not change after a roam. In one embodiment, a label is added to applications that:
  (a) Come from a Fastlane client (the Fastlane client is identified at association); and
  (b) Have an upstream QoS marking. These applications are in the client whitelist, which marks their importance for a client in the target network.

As an example, FIG. 1A the labels are shown reference numerals 117 and 118, and this be may be represented by one-bit flags.

A Fastlane client is also typically an IEEE 802.11r client that is capable of performing a FastTransition (FT) per 802.11r. IEEE 802.11r introduces a new concept of roaming where the initial handshake with the new AP is done even before the client roams to the new/target AP. The initial handshake allows the client and APs to do the Pairwise Transient Key (PTK) calculation in advance. These PTK keys are applied to the client and AP after the client does the reassociation request or response exchange with new target AP As shown in FIG. 1B, when the wireless client device 40 that is FT capable initiates a roaming action, it transmits an 802.11r FT action request at 120 that the AP 20(1) forwards to the wireless LAN controller 30. The controller 30 observes the 802.11r FT action request from the wireless client device 40 forwards it to the new AP 20(2) at 130 as part of the FT workflow. In addition, at 140, the controller retrieves the state table information for the wireless client device and sends it to the new AP 20(2). Thus, as shown in FIG. 1B, the AP 20(2) now has the state table 115 for the wireless client device 40, even before the wireless client device has moved to the AP 20(2).

Reference is now made to FIG. 1C. FIG. 1C shows that the wireless client device 40 has roamed to the new AP 20(2). As indicated at 150, the AP 20(2) applies the AVC policy based on the state table before the client roam is finalized.

Further details on the general process flow depicted in FIGS. 1A-1C are described below in connection with FIGS. 2-6.

IEEE 802.11r has two methods of roaming: Over-the-air and Over-the-DS (Distribution System). For an over-the-air roam, the client communicates directly with the target AP using IEEE 802.11 authentication with the FT authentication algorithm. For an over-the-DS roam, the client communicates with the target AP through the current AP. The communication between the client and the target AP is carried in FT action frames between the client and the current AP and is then sent through the controller.

Thus, when an 802.11r client initiates a roam, the client sends a FT authentication request to the new AP (over-the-air case) or through the current AP (over-the-DS case). In both cases, the request goes through the wireless LAN controller in centralized mode. Flex mode uses Flex group coordination.

An 802.11r Reassociation frame can contain a Resource Reservation Request (RRR) and a Resource Information Container (RIC) or only RIC (and not RRR).

In one embodiment, the client does not support IEEE 802.11r Resource Reservation Requests, but supports RIC (Resource Information Container). In that case, the client mentions the RIC request in the FT reassociation request. In another embodiment, the client supports Resource Reservation Requests. In that case, the RIC request is present in the Authentication Confirm frame, following the open authentication exchange (and before the reassociation frame exchange).

In both cases, the RIC request contains traffic descriptor that describes the traffic for which the QoS service is requested. In a roaming case, the request is unlikely to be new traffic (a new request exactly at the time of the roam is statistically unlikely) and likely to be the continuation of a flow going through the current AP.

Figure 2:
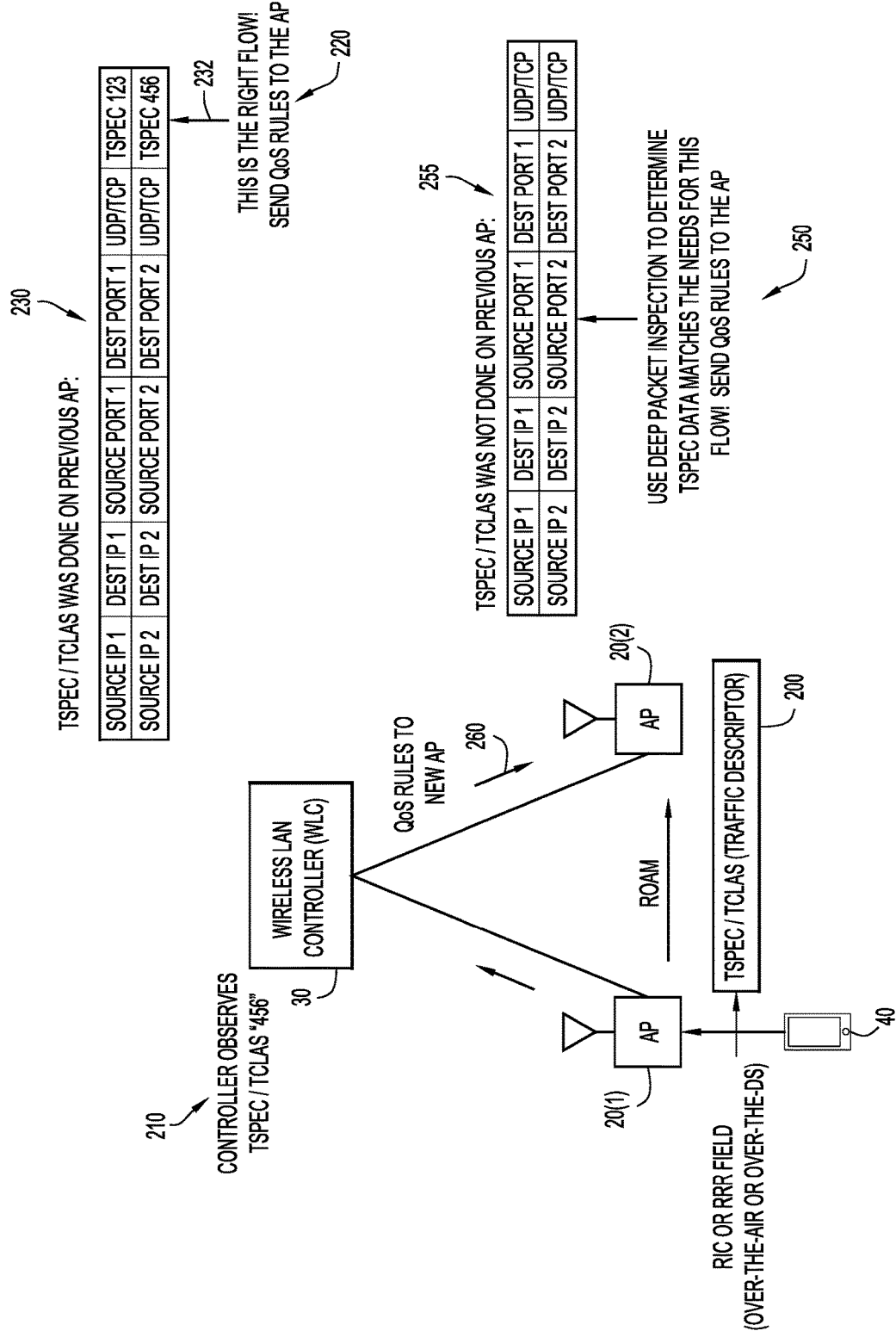
FIG. 2 illustrates an operational flow of the use of a first type of traffic descriptor scenario in the stateful QoS marking techniques, according to an example embodiment.

The traffic descriptor can take on different possible formats, and several examples are described below with reference to FIGS. 2-5. FIG. 2 shows an example in which the traffic descriptor uses the standard Traffic Specification/Traffic Classification (TSPEC/TCLAS) format of IEEE 802.11. This is shown at 200 in FIG. 2. The TSPEC/TCLAS traffic descriptor may in the RIC or RRR field (over-the-air or over-the-DS). TSPEC allows a wireless client to signal its traffic requirements to the AP. TSPEC can include data rate, packet size, number of stream, etc. TCLAS is an optional information element that contains a set of parameters to identify incoming frames with a particular traffic stream and is thus link to a particular TSPEC.

At 210, the wireless LAN controller 30 observes the TSPEC/TCLAS sent by the client via AP 20(1) and tries to match it against traffic in the NBAR table. If the target traffic flow was the subject of a previous TSPEC/TCLAS request on the current (previous before the roam) AP 20(1), it may already be labelled as such and its identification is easy. Thus, as shown in FIG. 2, at 210, the wireless LAN controller 30 detects "456" in the TSPEC/TCLAS element 200 and at 220 finds a match to a traffic flow in an NBAR table 230 maintained by the controller 30, as shown at 232.

If the target traffic flow is not labelled in the client NBAR table maintained by the wireless LAN controller 30, at 250, the wireless LAN controller 30 invokes NBAR deep packet inspection using the packet size and expected rates to identify the target traffic flow as shown at 255.

At 260, the controller either sends the QoS rules for the flow matching the TSPEC/TCLAS value (e.g., "456" in the example of FIG. 2.) at 220, or the QoS rules for the target traffic flow identified by deep packet inspection at 250.

Figure 3:
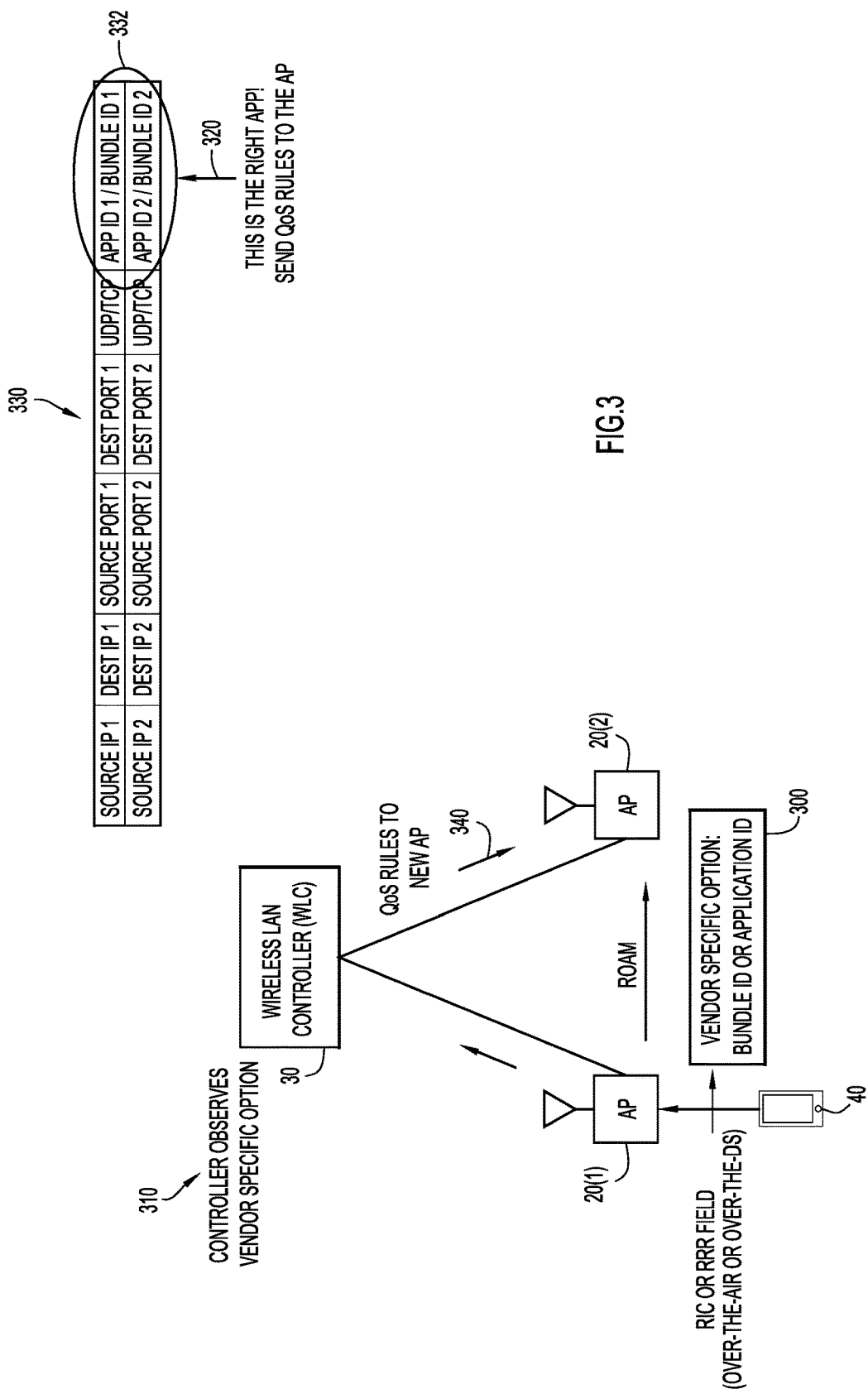
FIG. 3 illustrates an operational flow of the use of a second type of traffic descriptor scenario in the stateful QoS marking techniques, according to an example embodiment.

Reference is now made to FIG. 3 for another example of a traffic descriptor scenario. In this example, the client supports an enhanced version of Fastlane. In this case, the RIC request sent by wireless client device 40 contains the vendor specific option as shown at reference numeral 300. The RIC resource descriptor field can include two possible elements, depending on the embodiment: a bundle ID or an app ID. This identifier (bundle ID or app ID) is an application identifier used by the operating system of the wireless client device to uniquely identify an application. As described above, the bundle ID is used for apps in the Google Play™ store and will appear in the Uniform Resource Locator (URL) as https://play.google.com/store/apps/details?id=.com.appcompanyname.appname, where the italicized string is the bundle ID, In another example, the app ID can be found for apps in iTunes(R) store and will appear in the URL as https://itunes.apple.com/us/app/appcompanyname/id239455122?mt=7, where the italicized string is the app ID.

At 310, the wireless LAN controller 30 observes the vendor specific option 300. At 320, the wireless LAN controller 30 uses a lookup process to map the identifier (app ID or bundle ID) and the traffic identified by NBAR as shown in the NBAR table 330. The NBAR table 330 includes a field for the content of the vendor specific option as shown at 332. When a match is found, the controller 30 sends the QoS rules for that application to the new AP 20(1) as shown at 340.

Figure 4:
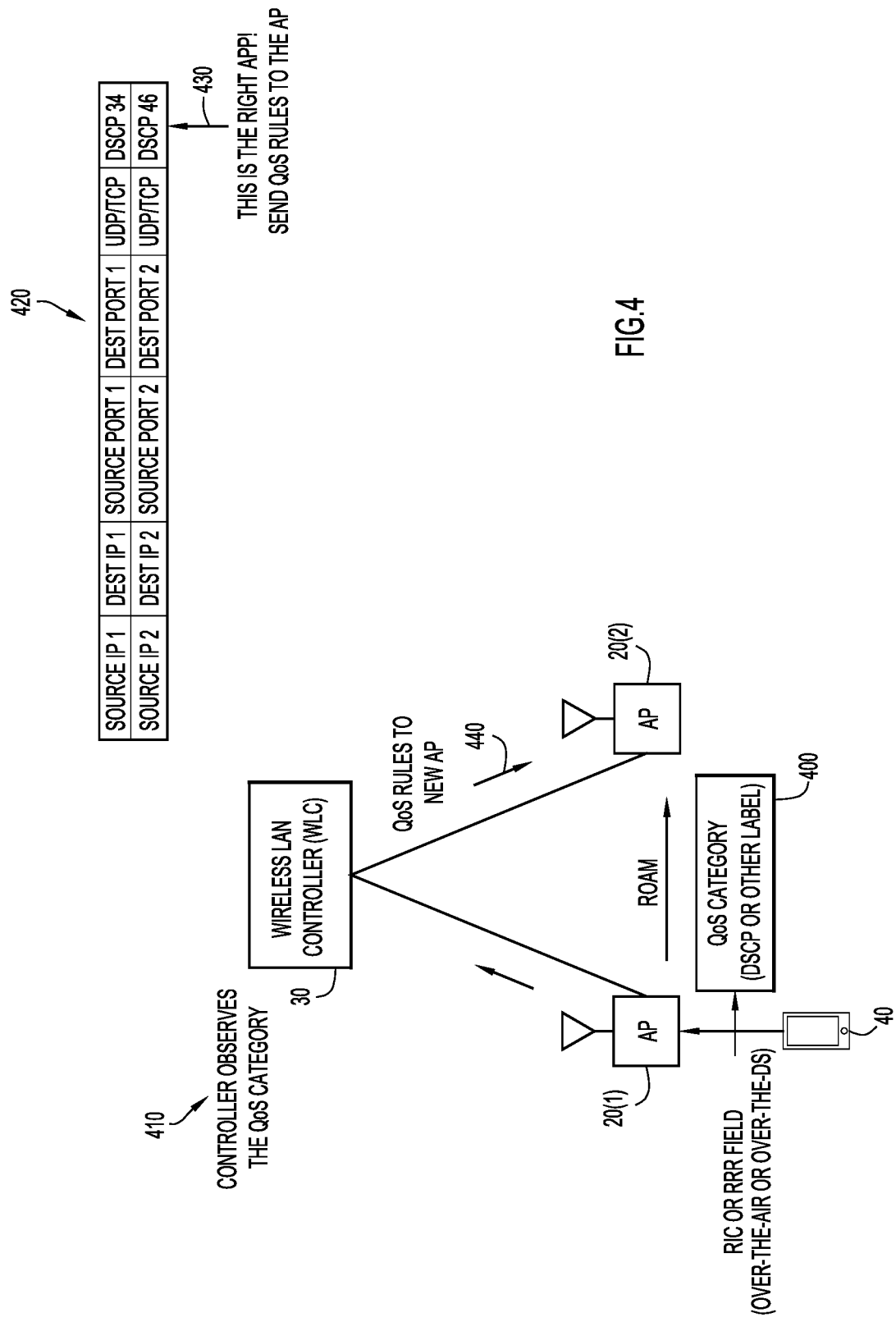
FIG. 4 illustrates an operational flow of the use of a third type of traffic descriptor scenario in the stateful QoS marking techniques, according to an example embodiment.

Reference is now made to FIG. 4 that shows another example traffic descriptor scenario. In this example, the traffic descriptor takes the form of a QoS category. This category can be a Differentiated Services Code Point (DSCP) value, a group of DSCP values, or a QoS category (e.g. voice, video, or other). The RIC request sent by wireless client device 40 contains the QoS category as shown at 400. At 410, the controller observes the QoS category in the RIC request. The wireless LAN controller 30 uses its own application classification system to identify all applications in the client NBAR table 420 that match the one or more categories contained in the RIC request. As shown at 430, if the QoS category (or categories) identified in the RIC request 400 match a QoS category descriptor stored in the NBAR table 420, then a match is determined and the controller 30, at 440, sends the QoS rules for that application to the AP 20(2).

Other means of identifying an application or a category of applications are also possible.

In all cases, as the wireless LAN controller 30 returns a response to the client through the current/previous AP 20(1), the wireless LAN controller 30 also transmits a rule, e.g., an AVC policy (such as QoS Access Control Lists) matching this traffic to the new AP 20(2). The wireless LAN controller 30 already has these rules, as they apply to the current AP 20(1). As a consequence, even before the client completes the roaming process, the new AP 20(2) already has the AVC policy and QoS ACL rules matching key traffic for the roaming client. Upstream marking happens as soon as the first data packet from the client reaches the new AP. Information about the other (non-essential) traffic is not mentioned, allowing a general "best effort" treatment for this other traffic (resource efficiency).

Figure 5:
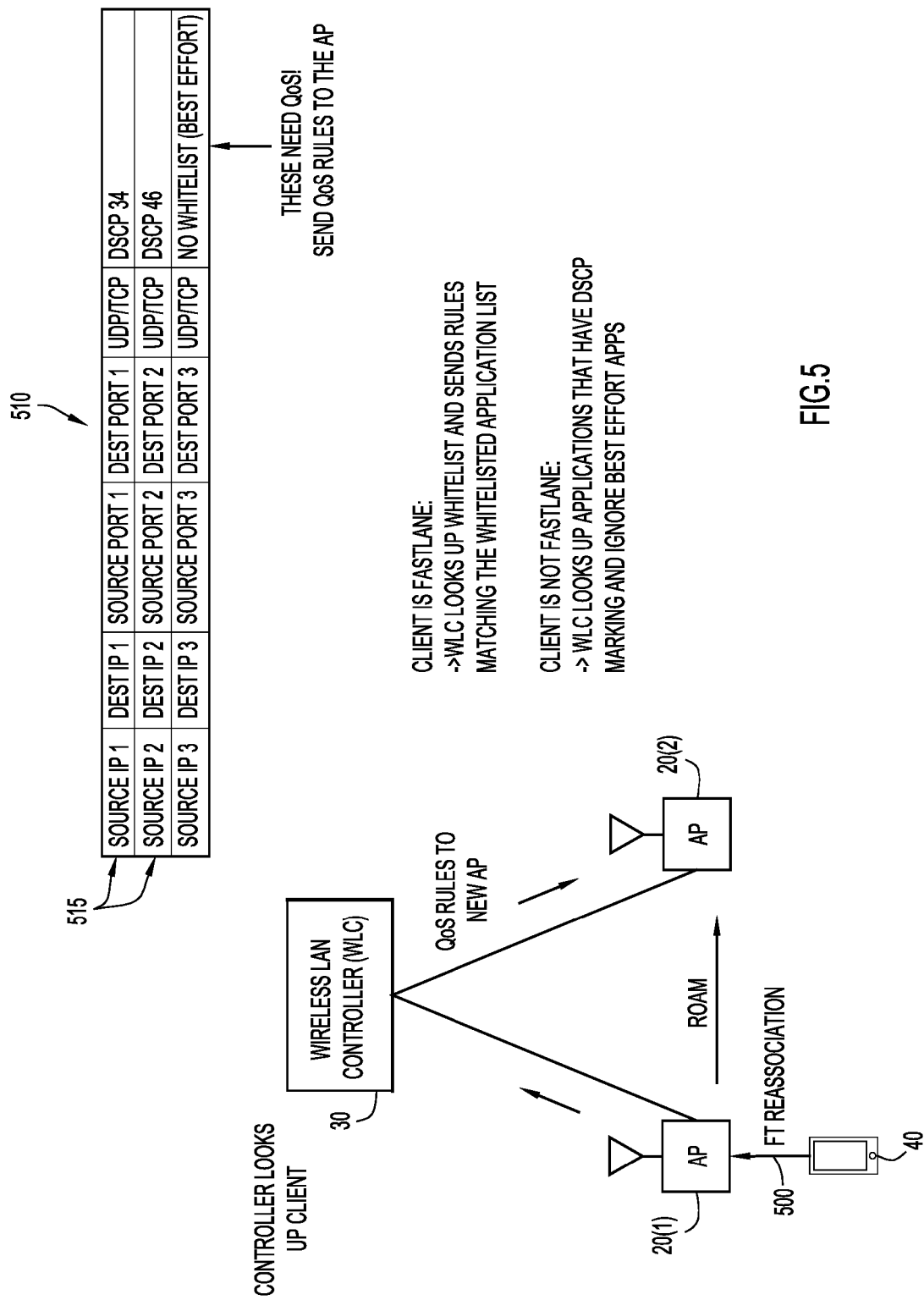
FIG. 5 illustrates an operational flow of the use of a fourth type of traffic descriptor scenario in the stateful QoS marking techniques, according to an example embodiment.

Reference is now made to FIG. 5. In some embodiments, the wireless client device 40 does not support RRRs, and also does not support MC. In this case, the client will not request a specific QoS service while roaming, as is the case in the scenarios of FIGS. 2-4. Instead, as the wireless LAN controller 30 receives the FT authentication request from the wireless client, the wireless LAN controller 30 performs a lookup in the client NBAR table and identifies all applications that are labelled as Fastlane and whitelist as described above. Thus, in the example shown in FIG. 5, at 500, the wireless client device 40 sends a FT reassociation request. The wireless LAN controller 30 looks up the client in the NBAR table 510 maintained for the client and finds applications that are labeled as Fastlane and whitelist. In the example of FIG. 5, reference numeral 515 points to the applications associated with flows that are labeled as Fastlane and whitelist (and also have DSCP markings "34" and "36"). The wireless LAN controller 30 then sends the QoS rules matching the whitelisted application list (identified by reference numeral 515) to the new AP 20(2).

In another embodiment, the wireless LAN controller 30 can also simply identify the applications that are marked upstream with QoS. Those applications are necessarily in the whitelist and are important for the client. As the wireless LAN controller 30 returns the FT authentication response, the wireless LAN controller 30 also forwards to the new AP 20(2) the QoS rules matching these key applications for this client, based on the 5-tuple identification. This way, QoS and other AVC policies are enabled even before the client completes roaming, and the very first upstream packets coming from the client will be marked at the new AP 20(2), while the rest of the traffic receives best effort treatment.

In one embodiment, the client is Fastlane capable, but does not support 802.11r. In that case, roaming follows the standard procedure, with full reauthentication or shorter reassociation (depending on the roaming scheme). In all cases, roaming frames (association or reassociation frames) are sent to the wireless LAN controller 30. Upon receiving the association/reassociation frame, the wireless LAN controller 30 identifies in the NBAR table all applications pertaining to this client that are marked with QoS (these applications are in the whitelist and are important for the client). The wireless LAN controller sends the (re) association response through the new AP 20(2), and will also forward to the new AP 20(2) the QoS upstream rules matching applications identified as whitelisted. This way, the client completes roaming at a time when upstream traffic is ready to be marked at the new AP 20(2), while the rest of the traffic receives best effort treatment.

Figure 6:
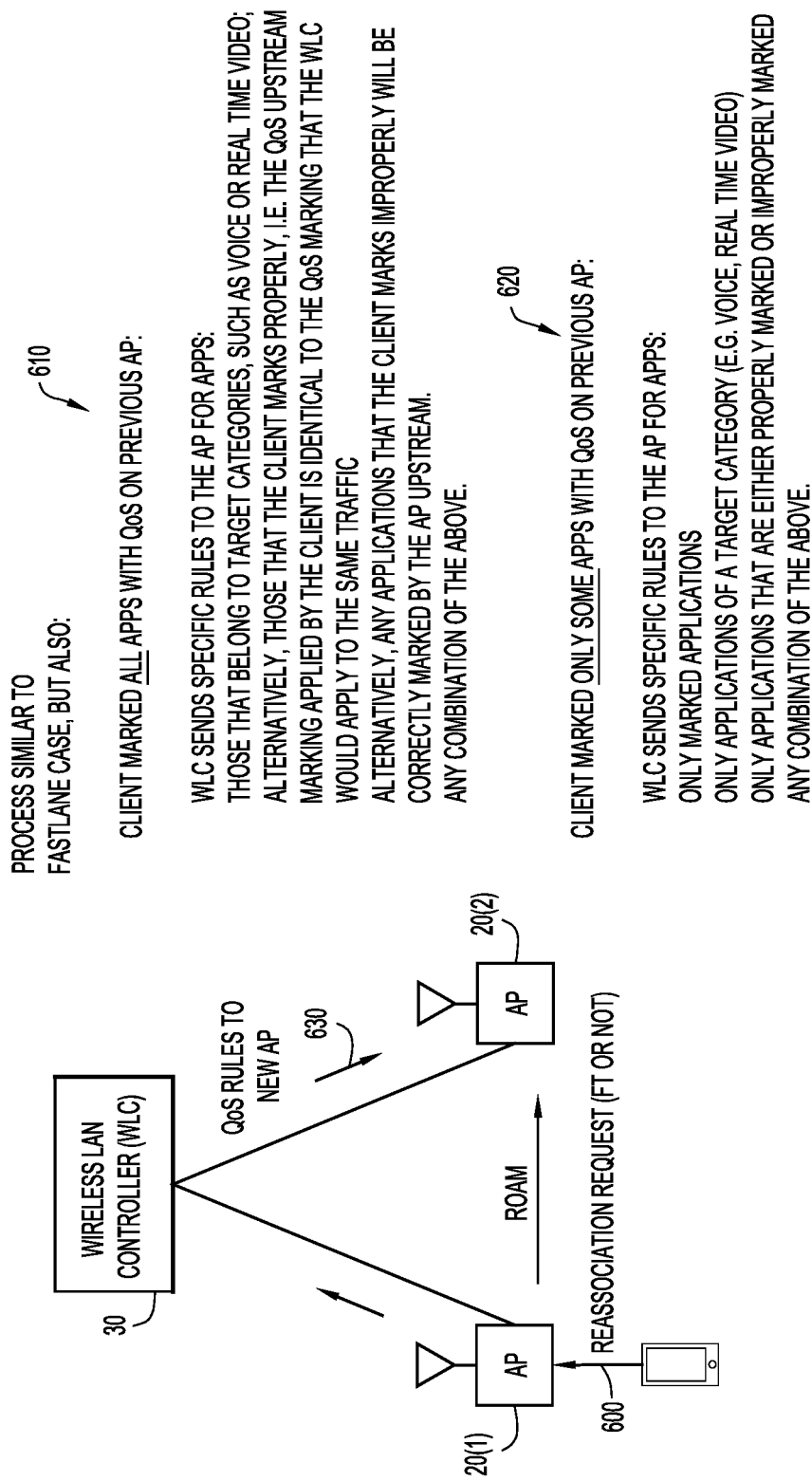
FIG. 6 illustrates an operational flow of the use of a fifth type of traffic descriptor scenario in the stateful QoS marking techniques, according to an example embodiment.

Reference is now made to FIG. 6. In another embodiment, the client is not an iOS client, and is not Fastlane capable. Thus, the reassociation request 600 is from an FT capable client (or a client not FT capable). The process is still similar to the Fastlane case. The client may support IEEE 802.11r, with resource request, or with RIC, and the same processes as described above in connection with FIGS. 2-5 may be used. However, there are several possible other variations.

In one variation shown at 610, the client marks QoS for all applications. In this case, the wireless LAN controller 30 may return QoS rules for all these applications, or only for some applications:

Those that belong to one or more predetermined (target) categories, such as voice or real time video;
Alternatively, those that the client marks properly, i.e. the QoS upstream marking applied by the client is identical to the QoS marking that the WLC would apply to the same traffic;
Alternatively, any applications that the client marks improperly will be correctly marked by the AP upstream.
Any combination of the above.

In the case of a client supporting QoS marking and supporting 802.11r, an embodiment allows the wireless LAN controller 30, in the RIC response, to mention/include the desired QoS marking for target traffic. This target traffic may be the one requested in the RIC request, or any other determinator (traffic belonging to one or several specific classifications, such as voice or real-time video, a configurable group of applications, or any other identifier). The RIC response may use the vendor specific format traffic descriptor described above to include an application identifier (based for example on application or bundle ID, or 5-tuple information), or the TSPEC format traffic descriptor described above.

In another case, the client does not mark QoS, or only partially marks QoS (some applications have a QoS marking, others do not). This is shown at 620 in FIG. 6. In that case, the wireless LAN controller may decide to return rules for all identified applications, or selectively return rules for only some applications with the similar logic described above:

Only marked applications
Only applications of a target category (e.g. Voice, real time video)
Only applications that are either properly marked or improperly marked
Any combination of the above.

In the case of a client not marking QoS or only partially marking QoS on the previous AP and supporting IEEE 802.11r, the wireless LAN controller 30 sends specific rules to the client, in RIC response/proprietary field for applications: belonging to one or several specific classifications such as voice or real-time video, a configurable group of applications, or any other identifier.

However the QoS rules are determined for the scenarios depicted in FIG. 6, the wireless LAN controller 30 sends the QoS rules to the new AP 20(2) at 630.

In all the scenarios described above, in the case of FlexConnect and intra-Flex group roaming, the current AP has the QoS rules and plays a role similar to that of the wireless LAN controller in the centralized cases.

Figure 7:
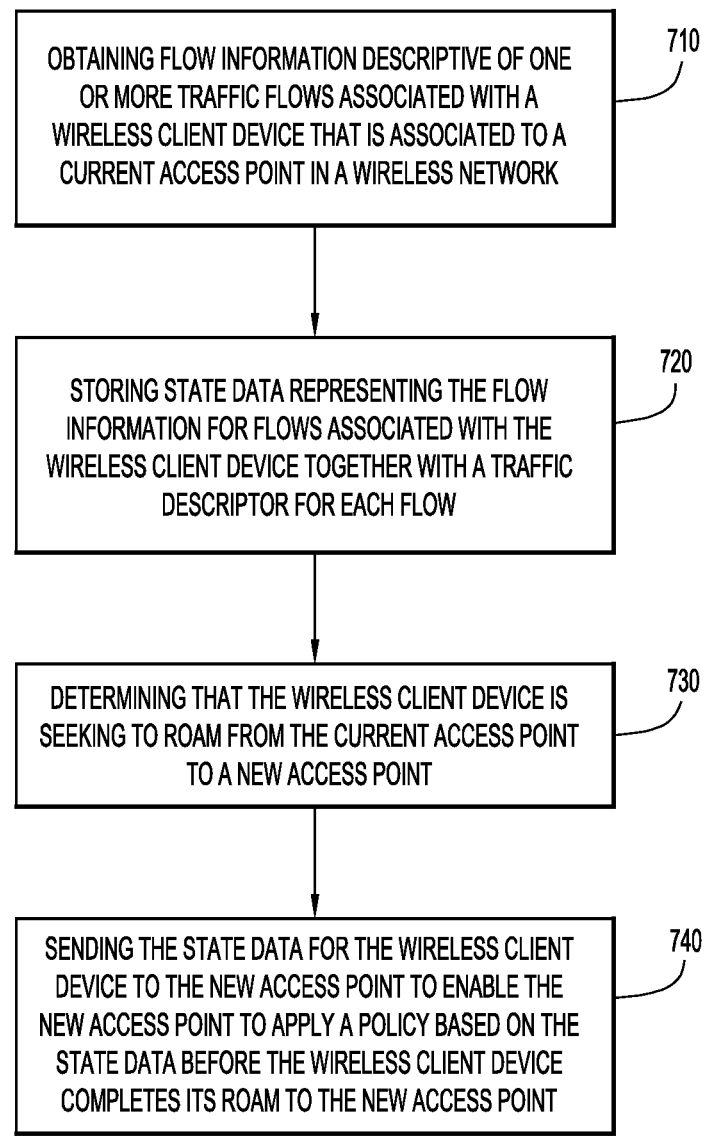
FIG. 7 illustrates a flow chart of the operations performed by a wireless network controller as part of the stateful QoS marking techniques, according to an example embodiment.

Turning now to FIG. 7, a flow chart is shown of a method 700 for stateful QoS roaming based on the techniques described above in connection with FIGS. 1A, 1B, 1C and 2-6. This flow chart represents operations of method 700 performed from the perspective of a wireless LAN controller, e.g., wireless LAN controller 30 referred to in the above-mentioned figures. At 710, the wireless LAN controller obtains flow information descriptive of one or more traffic flows associated with a wireless client device that is associated to a current access point in a wireless network. This is based on information that the wireless LAN controller receives from flows received by the current access point to which the wireless client device is associated. At 720, the wireless LAN controller stores state data (i.e., a state table) representing the flow information for flows associated with the wireless client device together with a traffic descriptor for each flow. At 730, the wireless LAN controller determines that the wireless client device is seeking to roam from the current access point to a new access point. At 740, the wireless LAN controller sends state data for the wireless client device to the new access point to enable the new access point to apply a policy based on the state data before the wireless client device completes its roam to the new access point.

As explained above in connection with FIG. 1A, the wireless LAN controller appends a label to the state data for the wireless client device to indicate whether the traffic flow is from a wireless client device that is capable of creating a whitelist of one or more applications to mark for Quality of Service (QoS) treatment, and to indicate that an application of a traffic flow has authorized upstream QoS marking. For example, One use of this label is to catch clients that may mark traffic for which QoS was not allowed (not in the whitelist) on the previous/current AP, and therefore wipe the QoS marking out as the packets appear at the new AP.

As described above, the wireless LAN controller may determine and store policy data describing the policy to be applied to the matching traffic at the new access point. Thus, the sending operation 740 may involve sending the policy data to the new access point.

Moreover, as described above in connection with FIGS. 2-6, the traffic descriptor can take on a variety of forms. In one form, the traffic descriptor indicates a target traffic flow for which QoS service is requested by the client device, and the traffic descriptor is included in a roaming request transmitted by the wireless client device. The roaming request may be a reassociation request, de-authorization/authorization exchange or other "smart" message exchange beyond reassociation. In another form, the traffic descriptor is an application identifier.

In still another form, the traffic descriptor is a Traffic Specification/Traffic Classification (TSPEC/TCLAS) request of IEEE 802.11. If target traffic flow was the subject of a previous TSPEC/TCLAS request on the current access point, the method 700 further includes identifying the target traffic flow by comparing the TSPEC/TCLAS request against application recognition data obtained by the wireless network controller or current access point. The application recognition data may be store elsewhere and obtained by the wireless LAN controller or an access point. If the target traffic flow is not labeled in the application recognition data, the method 700 further includes performing application recognition deep packet inspection using one or more of packet size, expected rates and/or other flow descriptors (e.g., IPv4, IPv6 or other L3 identifier) to identify the target traffic flow In still another form, the traffic descriptor is included in a vendor specific option contained in a Resource Information Container (RIC) request received from the wireless client device in the reassociation request, and the traffic descriptor is a bundle identifier or an app identifier.

In yet another form, the traffic descriptor is a QoS category, a Differentiated Services Code Point (DSCP) value or a group of DSCP values.

The method 700 may further include performing a look up in application recognition data stored by the wireless network controller for the wireless client device to identify any applications that are labeled as a traffic flow from a wireless client device that is capable of creating a whitelist of one or more applications to mark for Quality of Service (QoS) treatment.

Similarly, the method 700 may further include identifying one or more applications that are marked for Quality of Service (QoS) treatment for the wireless client device, wherein sending operation 740 includes sending data describing one or more rules matching the one or more applications.

Figure 8:
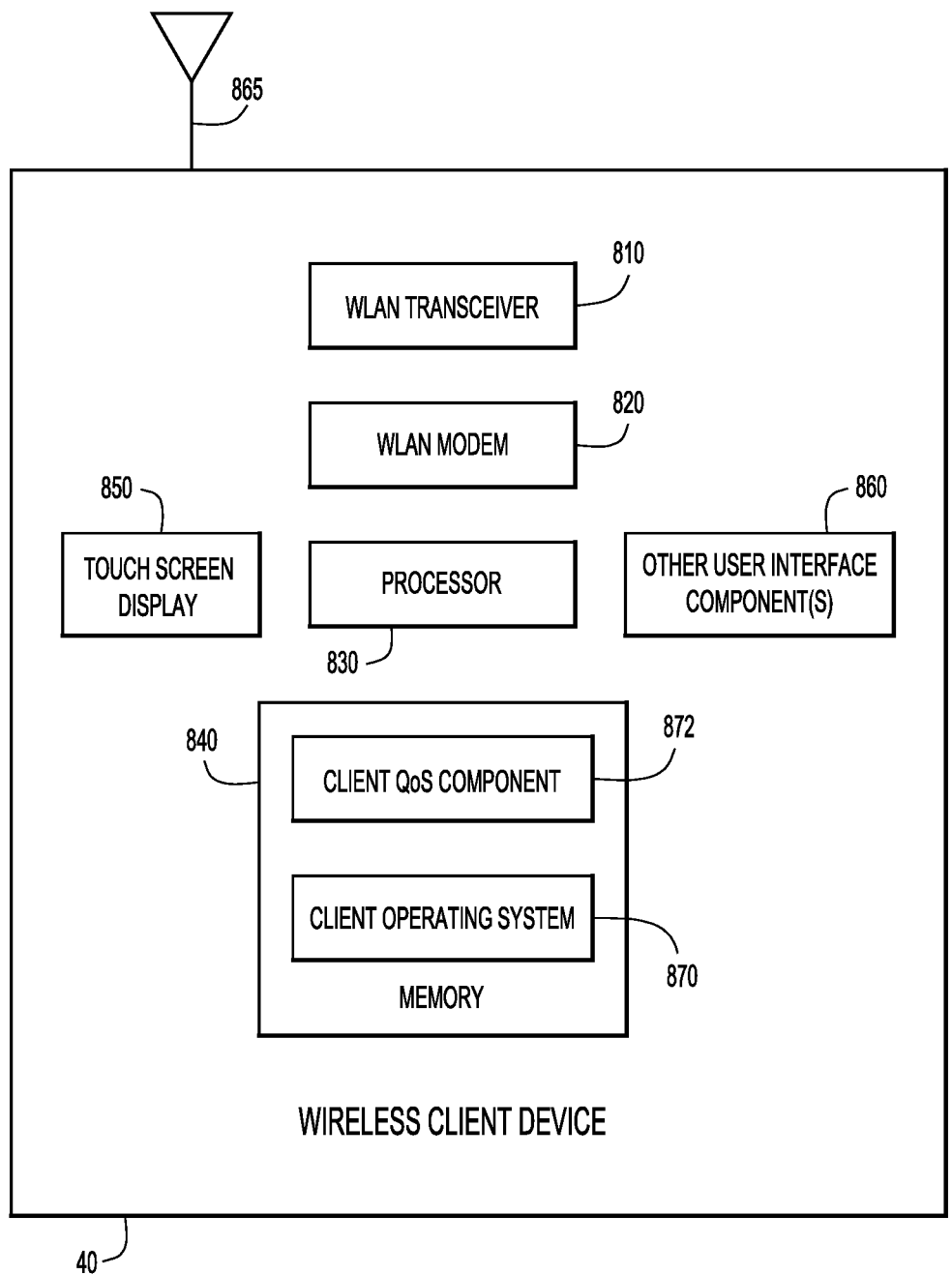
FIG. 8 is a block diagram of a wireless client device configured to participate in the stateful QoS marking techniques, according to an example embodiment.

FIG. 8 illustrates a block diagram of wireless client device 40 configured to participate in the mechanisms presented herein. The client 40 includes, among other components, a WLAN transceiver 810, WLAN modem 820, a processor 830, a memory 840, a touch screen display 850 and/or other user interface components 860, and one or more antennas 865. The WLAN transceiver 810 and WLAN modem 820 may be part of a WLAN chipset that consists of one or more application specific integrated circuits configured to support a WLAN standard, such as the IEEE 802.11 standard. The processor 830 may be embodied by one or more of a microprocessor or microcontroller. The memory 840 stores instructions for a client operating system 870 and for the aforementioned client QoS component 872. The client operating system 870 together with, or separate from the client QoS component cause the processor 830, when executed, to perform the client-side functions described herein.

Figure 9:
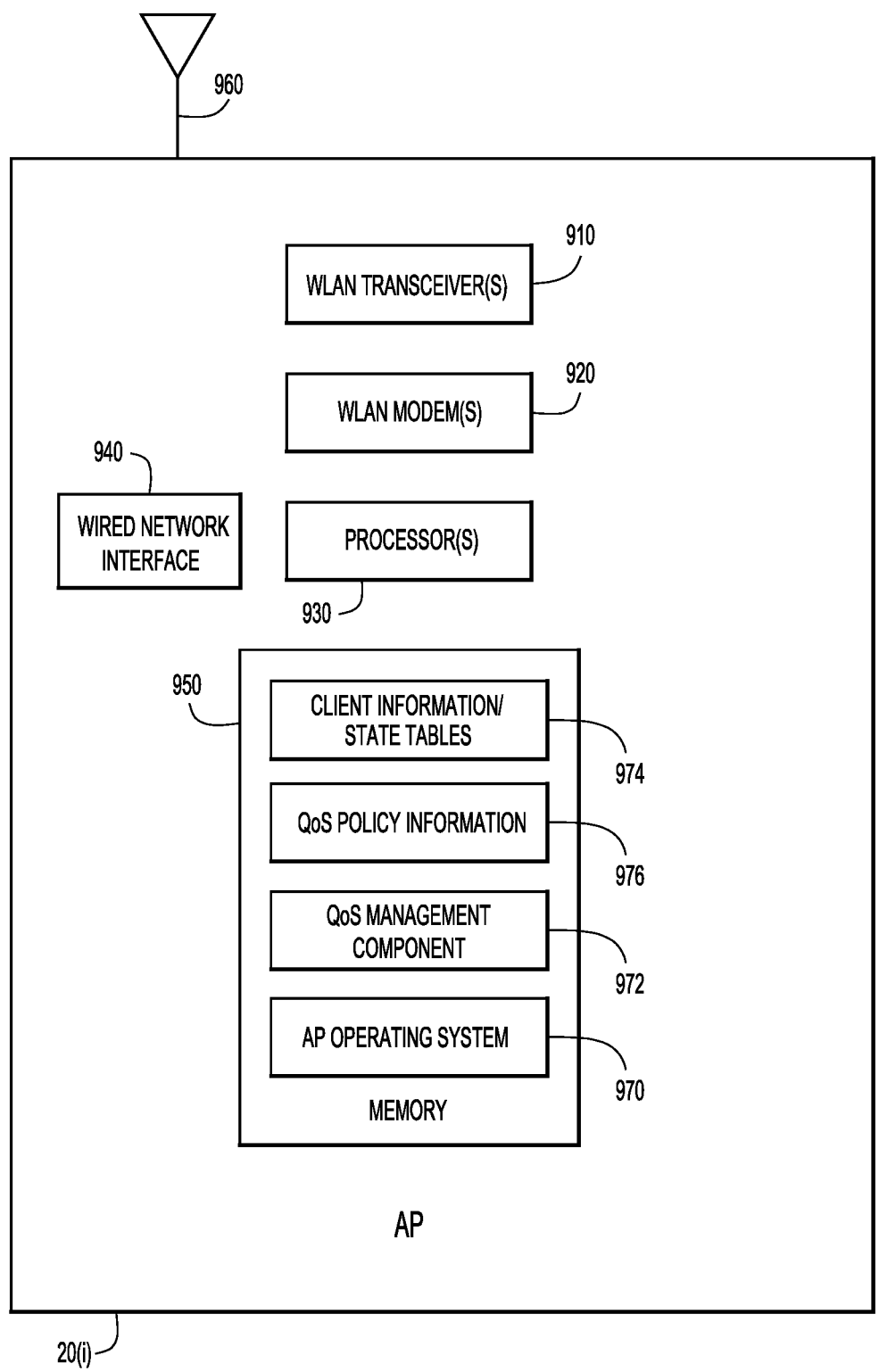
FIG. 9 is a block diagram of a wireless access point configured to participate in the stateful QoS marking techniques, according to an example embodiment.

FIG. 9 illustrates a block diagram of an AP 20(i) configured to participate in the mechanisms described herein. The AP 20(i) includes, among other components, one or more WLAN transceivers 910, one or more WLAN modems 920, one or more processors 930, a wired network interface (e.g., network interface card), a memory 950 and one or more antennas 960. The one or more WLAN transceivers 910 and one or more WLAN modems 920 may be part of one or more WLAN chipsets that consists of one or more application specific integrated circuits configured to support a WLAN standard, such as the IEEE 802.11 standard. The memory 950 stores instructions for AP operating system 970 and for the aforementioned QoS management component 972, that when executed by the processor, cause the AP to perform the AP-side operations described, including the AVC function. Furthermore, the memory 950 stores the client information/state tables 974 and QoS policy information 976 referred to above in connection with FIGS. 1A-1C, and 2-6.

Figure 10:
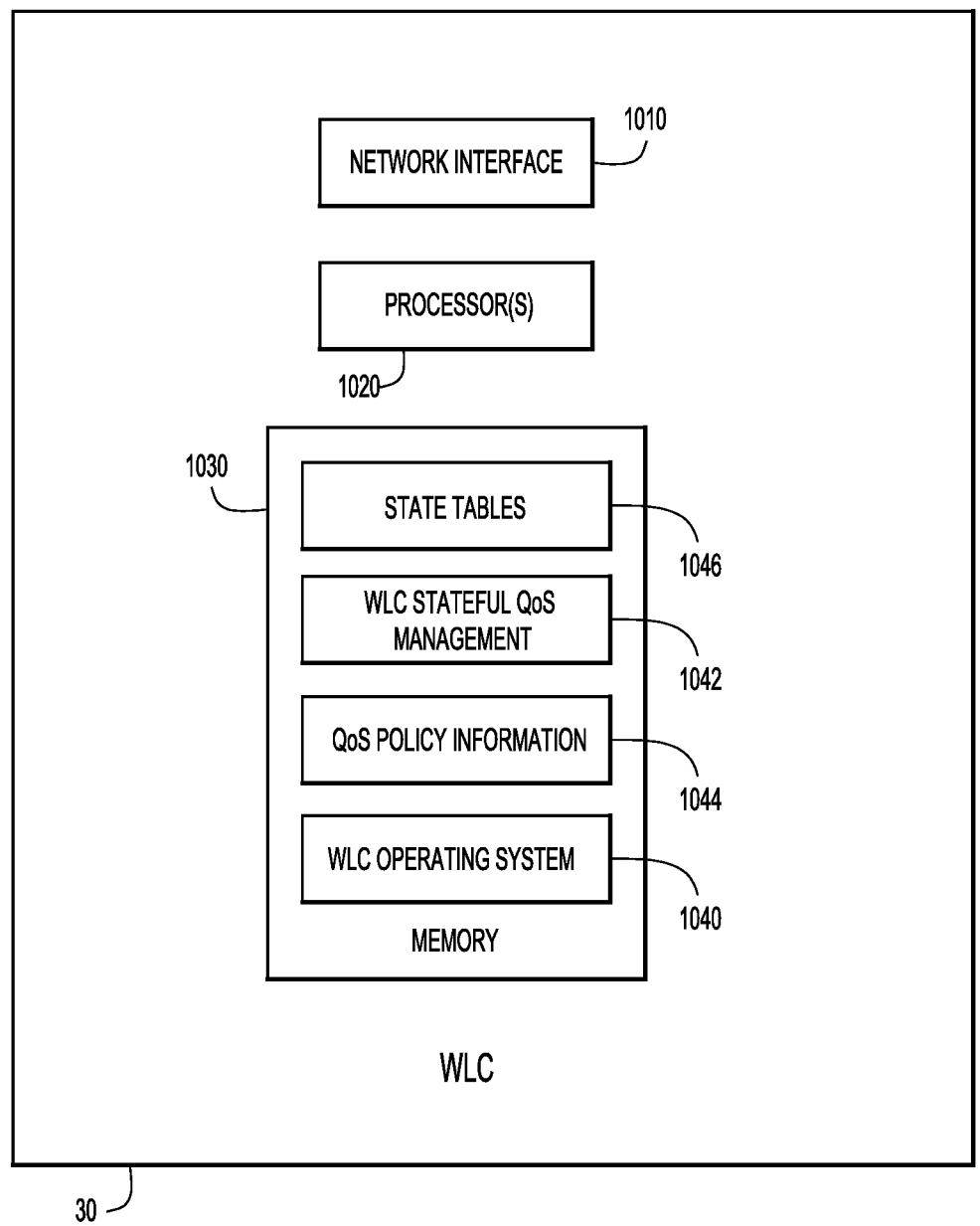
FIG. 10 is a block diagram of a wireless network controller configured to participate in the stateful QoS marking techniques, according to an example embodiment.

FIG. 10 illustrates a block diagram of wireless LAN controller (WLC) 30 configured to perform the operations described herein. The WLC 30 includes one or more network interfaces (e.g., network interface cards) 1010, one or more processors 1020 and a memory 1030. The memory 1030 stores instructions for a WLC operating system 1040, and a WLC stateful QoS management component 1042 that, when executed by the one or more processors, cause the one or more processors to perform the WLC-side operations as part of the mechanisms described herein. The memory 1030 also stores QoS policy information 1044 and state tables 1046 for use in connection with the stateful QoS roaming techniques described herein.

The memory shown in FIGS. 8-10 may take the form of read only memory (ROM), random access memory (RAM), magnetic disk storage media devices, optical storage media devices, flash memory devices, electrical, optical, or other physical/tangible memory storage devices. Thus, in general, the memory may comprise one or more tangible (non-transitory) computer readable storage media (e.g., a memory device) encoded with software comprising computer executable instructions and when the software is executed (by the controller) it is operable to perform the operations described herein.

This stateful roaming techniques presented herein use AVC and flow state table information along with specific labels (FastLane, whitelist) to identify clients and critical applications that have been identified as critical for Fastlane or QoS clients. When a client roams from one AP to another, the WLC pre-populates the new AP with the AVC policy rules (such as QoS markings) based on knowledge derived of the client's current traffic through the current AP and the above labels, to make sure that the target client upstream QoS on the new AP will be correctly handled from the very first packet for the target key applications, thus improving the client roaming experience and security of the network, while other client and other application traffic receive a best effort default treatment (saving AVC computational resources). Again, these techniques all for targeted stateful AVC to support strict and immediate AVC policies during and after a roam for specific clients, and specific applications for these clients.

Thus, in one form, a method is provided comprising: obtaining flow information descriptive of one or more traffic flows associated with a wireless client device that is associated to a current access point in a wireless network; storing state data representing the flow information for flows associated with the wireless client device together with a traffic descriptor for each flow; determining that the wireless client device is seeking to roam from the current access point to a new access point; and sending the state data for the wireless client device to the new access point to enable the new access point to apply a policy based on the state data before the wireless client device completes its roam to the new access point.

In another form, an apparatus is provided comprising: a network interface configured to enable network communications; a memory; a processor coupled to the network interface and the memory, wherein the processor is configured to perform operations including: obtaining flow information descriptive of one or more traffic flows associated with a wireless client device that is associated to a current access point in a wireless network; storing state data representing the flow information for flows associated with the wireless client device together with a traffic descriptor for each flow; determining that the wireless client device is seeking to roam from the current access point to a new access point; and sending the state data for the wireless client device to the new access point to enable the new access point to apply a policy based on the state data before the wireless client device completes its roam to the new access point.

In still another form, one or more non-transitory computer readable storage media are provided encoded with instructions that, when executed by a processor, cause the processor to perform operations comprising: obtaining flow information descriptive of one or more traffic flows associated with a wireless client device that is associated to a current access point in a wireless network; storing state data representing the flow information for flows associated with the wireless client device together with a traffic descriptor for each flow; determining that the wireless client device is seeking to roam from the current access point to a new access point; and sending the state data for the wireless client device to the new access point to enable the new access point to apply a policy based on the state data before the wireless client device completes its roam to the new access point.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   obtaining flow information descriptive of one or more traffic flows associated with a wireless client device that is associated to a current access point in a wireless network;
   storing state data representing the flow information for traffic flows associated with the wireless client device together with a traffic descriptor for each traffic flow, and appending a label to the state data for the wireless client device to indicate whether the traffic flow is from a wireless client device that is capable of creating a whitelist of one or more applications to mark for Quality of Service (QoS) treatment;

determining that the wireless client device is seeking to roam from the current access point to a new access point; and sending the state data for the wireless client device to the new access point to enable the new access point to apply a policy based on the state data before the wireless client device completes its roam to the new access point.

2. The method of claim 1, wherein the label further indicates that an application of a traffic flow has authorized upstream QoS marking.

3. The method of claim 2, further comprising storing at a wireless network controller policy data describing the policy to be applied to matching traffic at the new access point, and wherein sending comprises sending the policy data to the new access point.

4. The method of claim 3, wherein the traffic descriptor indicates a target traffic flow for which QoS service is requested by the client device, and the traffic descriptor is included in a roaming request transmitted by the wireless client device.

5. The method of claim 4, wherein the traffic descriptor is an application identifier.

6. The method of claim 4, wherein the traffic descriptor is a Traffic Specification/Traffic Classification (TSPEC/TCLAS) request of IEEE 802.11, and wherein if target traffic flow was the subject of a previous TSPEC/TCLAS request on the current access point, further comprising identifying the target traffic flow by comparing the TSPEC/TCLAS request against application recognition data obtained by the wireless network controller or current access point, and if the target traffic flow is not labeled in the application recognition data, performing application recognition deep packet inspection using one or more of packet size, expected rates and/or other flow descriptors to identify the target traffic flow.

7. The method of claim 4, wherein the traffic descriptor is included in a vendor specific option contained in a Resource Information Container (RIC) request received from the wireless client device in the roaming request, and the traffic descriptor is a bundle identifier or an app identifier.

8. The method of claim 4, wherein the traffic descriptor is a QoS category, a Differentiated Services Code Point (DSCP) value or a group of DSCP values.

9. The method of claim 3, further comprising:

performing a look up in application recognition data stored by the wireless network controller for the wireless client device to identify any applications that are labeled as a traffic flow from a wireless client device that is capable of creating a whitelist of one or more applications to mark for Quality of Service (QoS) treatment.

10. The method of claim 3, further comprising:

identifying one or more applications that are marked for Quality of Service (QoS) treatment for the wireless client device; and wherein sending comprises sending data describing one or more rules matching the one or more applications.

11. An apparatus comprising:

a network interface configured to enable network communications;

a memory;

a processor coupled to the network interface and the memory, wherein the processor is configured to perform operations including:

obtaining flow information descriptive of one or more traffic flows associated with a wireless client device that is associated to a current access point in a wireless network;

storing state data representing the flow information for traffic flows associated with the wireless client device together with a traffic descriptor for each traffic flow, and appending a label to the state data for the wireless client device to indicate whether the traffic flow is from a wireless client device that is capable of creating a whitelist of one or more applications to mark for Quality of Service (QoS) treatment;

determining that the wireless client device is seeking to roam from the current access point to a new access point; and sending the state data for the wireless client device to the new access point to enable the new access point to apply a policy based on the state data before the wireless client device completes its roam to the new access point.

12. The apparatus of claim 11, wherein the label further indicates that an application of a traffic flow has authorized upstream QoS marking.

13. The apparatus of claim 12, wherein the processor is configured configure to perform operations including: storing policy data describing the policy to be applied to matching traffic at the new access point, and wherein sending comprises sending the policy data to the new access point.

14. The apparatus of claim 13, wherein the traffic descriptor indicates a target traffic flow for which QoS service is requested by the client device, and the traffic descriptor is included in a roaming request transmitted by the wireless client device.

15. The apparatus of claim 14, wherein the traffic descriptor is an application identifier.

16. The apparatus of claim 14, wherein the traffic descriptor is a Traffic Specification/Traffic Classification (TSPEC/TCLAS) request of IEEE 802.11, and wherein if target traffic flow was the subject of a previous TSPEC/TCLAS request on the current access point, further comprising identifying the target traffic flow by comparing the TSPEC/TCLAS request against application recognition data, and if the target traffic flow is not labeled in the application recognition data, performing application recognition deep packet inspection using one or more of packet size, expected rates and/or other flow descriptors to identify the target traffic flow.

17. One or more non-transitory computer readable storage media encoded with instructions that, when executed by a processor, cause the processor to perform operations comprising:

obtaining flow information descriptive of one or more traffic flows associated with a wireless client device that is associated to a current access point in a wireless network;

storing state data representing the flow information for traffic flows associated with the wireless client device together with a traffic descriptor for each traffic flow, and appending a label to the state data for the wireless client device to indicate whether the traffic flow is from a wireless client device that is capable of creating a whitelist of one or more applications to mark for Quality of Service (QoS) treatment;

determining that the wireless client device is seeking to roam from the current access point to a new access point; and sending the state data for the wireless client device to the new access point to enable the new access point to apply a policy based on the state data before the wireless client device completes its roam to the new access point.

18. The non-transitory computer readable storage media of claim 17, wherein the label further indicates that an application of a traffic flow has authorized upstream QoS marking.

19. The non-transitory computer readable storage media of claim 18, wherein the operations further include: storing policy data describing the policy to be applied to matching traffic at the new access point, and wherein sending comprises sending the policy data to the new access point.

20. The non-transitory computer readable storage media of claim 19, wherein the traffic descriptor indicates a target traffic flow for which QoS service is requested by the client device, and the traffic descriptor is included in a roaming request transmitted by the wireless client device.

\* \* \* \* \*